(12) United States Patent
Lau et al.

(10) Patent No.: US 11,363,144 B2
(45) Date of Patent: Jun. 14, 2022

(54) DEVICE-BASED AUDIO PROCESSING FOR ENHANCED CUSTOMER SUPPORT

(71) Applicant: T-Mobile USA, Inc., Bellevue, WA (US)

(72) Inventors: Kevin Lau, Issaquah, WA (US); Timothy Shelton, North Bend, WA (US); Robert Stamm, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/027,624

(22) Filed: Sep. 21, 2020

(65) Prior Publication Data

US 2022/0094789 A1 Mar. 24, 2022

(51) Int. Cl.
*H04M 3/51* (2006.01)
*G10L 15/26* (2006.01)
*G06N 20/00* (2019.01)
*H04M 3/523* (2006.01)

(52) U.S. Cl.
CPC .......... *H04M 3/5191* (2013.01); *G06N 20/00* (2019.01); *G10L 15/26* (2013.01); *H04M 3/5141* (2013.01); *H04M 3/523* (2013.01)

(58) Field of Classification Search
CPC combination set(s) only.
See application file for complete search history.

(56) References Cited

U.S. PATENT DOCUMENTS

| 10,334,415 | B2 | 6/2019 | Kwong et al. | |
|---|---|---|---|---|
| 2009/0210524 | A1* | 8/2009 | McCormack | H04L 65/4007 709/223 |
| 2010/0087175 | A1* | 4/2010 | Roundtree | H04M 3/42178 455/414.1 |
| 2012/0321052 | A1* | 12/2012 | Morrill | H04L 67/18 379/32.01 |
| 2016/0112894 | A1* | 4/2016 | Lau | H04L 43/10 370/252 |
| 2017/0006161 | A9* | 1/2017 | Riahi | H04M 3/5235 |
| 2017/0134459 | A1* | 5/2017 | Shetty | H04L 65/80 |
| 2020/0099790 | A1 | 3/2020 | Ma et al. | |
| 2020/0227026 | A1 | 7/2020 | Rajagopal et al. | |

* cited by examiner

*Primary Examiner* — Phung-Hoang J Nguyen
(74) *Attorney, Agent, or Firm* — Han Santos, PLLC

(57) ABSTRACT

A text representation is received from a virtual assistant application on a user device. The text representation may be generated via a speech-to-text engine of the virtual assistant application from audio speech spoken by a customer. Device diagnostic data of the user device is also received from the virtual assistant application. An identifier of the customer is placed in an assistance queue. At least information in the text representation and the device diagnostic data is analyzed to determine an issue associated with the user device and a solution for resolving the issue, so that the solution is applied. In response to the identifier of the customer reaching a front of the assistance queue, session state information that includes at least the text representation and a description of the issue is provided to a support application. A voice support session is initiated between the support application and the virtual assistant application.

20 Claims, 6 Drawing Sheets

DEVICE-BASED AUDIO PROCESSING FOR ENHANCED CUSTOMER SUPPORT

BACKGROUND

Mobile devices are integral to the daily lives of most users. Mobile devices are used to make voice calls, check email and text messages, update social media pages, stream media, browse websites, and so forth. As a result, users of mobile devices expect a wireless telecommunication carrier to provide constant and reliable telecommunication and data communication services at all times. The reliability of telecommunication and data communication services may be affected by multiple factors, such as geography and terrain, device features and capabilities, as well as network infrastructure and network coverage deployment. Some mobile devices are equipped with virtual assistants, sometimes also referred to as virtual voice assistants (VVAs) or intelligent virtual assistants (IVAs), which are software agents that can answer user questions and perform tasks based on user voice commands or questions.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
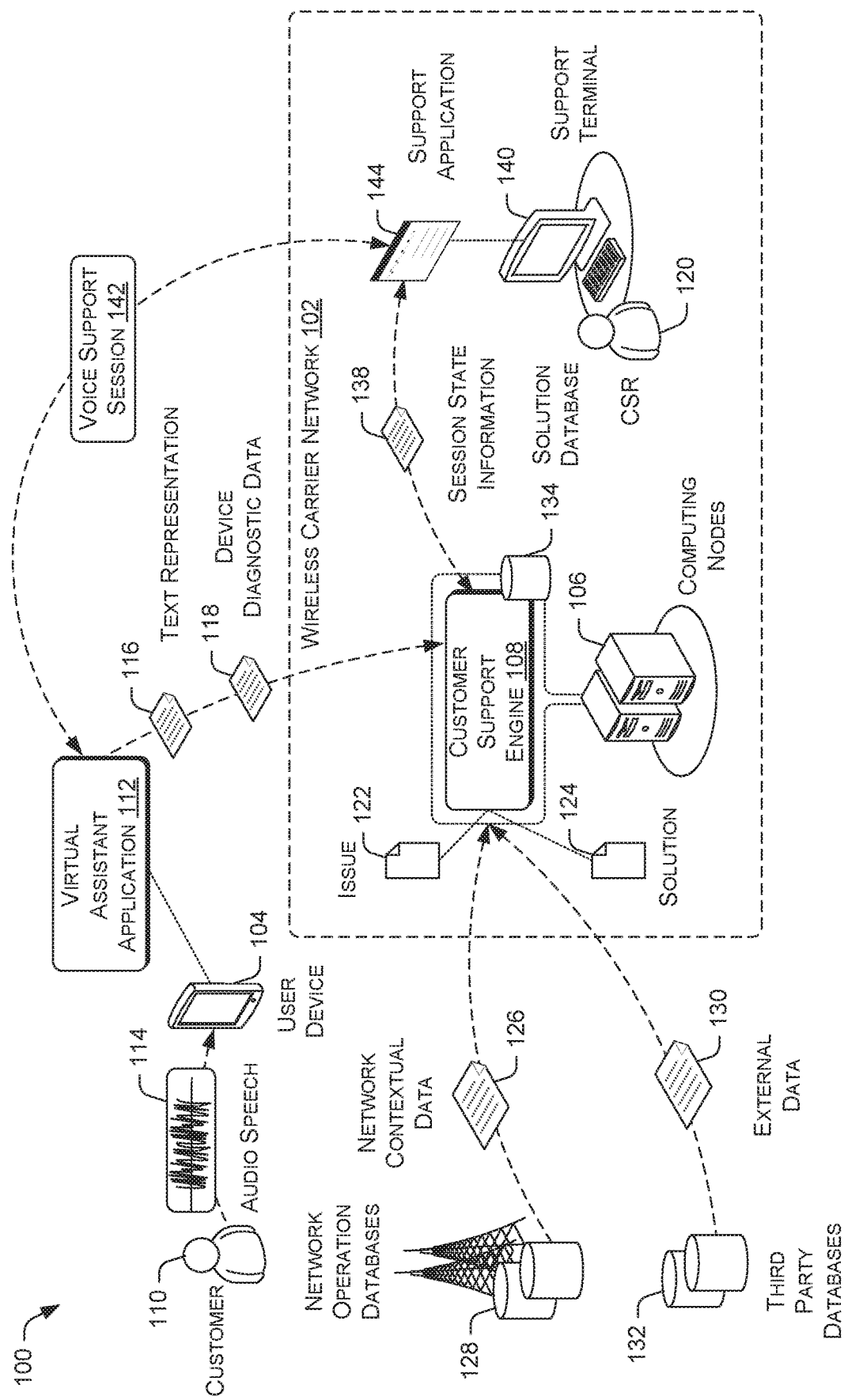
FIG. 1 illustrates an example architecture that provides device-based audio processing for enhanced customer support in the context of wireless telecommunication services.

This disclosure is directed to techniques for using virtual assistant applications on user devices to provide enhanced customer support in the context of wireless telecommunication services. The virtual assistant application on a user device may serve as an initial point of contact in an enhanced customer support model that uses both the virtual assistant application and a human customer service representative (CSR). The virtual assistant application on the user device may enable a customer to make a statement or ask a question about a problem that the customer is experiencing with the wireless telecommunication services provided by a wireless carrier network. For example, the virtual assistant application may provide a virtual chat agent that uses speech to prompt the customer to make the statement or ask the question. The virtual assistant application may transcribe the spoken speech of the customer into a text representation. Subsequently, the virtual assistant application may also retrieve device diagnostic data from the user device.

The virtual application may send the text representation and the device diagnostic data to a customer support engine in the core network of the wireless carrier network. In turn, the customer support engine may place the customer in an assistance queue for a voice support session with a human customer service representative. Further, the customer support engine may use a machine learning algorithm to analyze the text representation and the device diagnostic data to determine an issue with the user device and a solution for resolving the issue. In some instances, the machine learning algorithm may be configured to take into consideration additional sources of data while performing the analysis. For example, the additional sources of data may include network data of the wireless carrier network. Following the analysis, the customer support engine may direct the virtual assistant application to prompt the customer for permission to apply the solution. For example, the virtual chat agent provided by the virtual assistant application may use synthesized speech and/or displayed text to notify the customer of the solution and prompt the customer to respond with consent to apply the solution. Accordingly, if the customer grants the virtual assistant application permission to apply the solution, the virtual assistant application may notify the customer support engine of the authorization. In turn, the customer support engine may apply the solution. For example, the customer may grant permission to the virtual assistant application by verbally providing authorization or manually inputting an authorization command via a tactile user interface of the user device. In some embodiments, the solution may include configuration modifications or setting modifications to at least one component of the user device and/or at least one component of the wireless carrier network. The components of the user device or the wireless carrier network may include hardware components and/or software components.

When the customer has advanced to a front of the assistant queue for speaking with the human CSR, the customer support engine may provide session state information to a support terminal of the human CSR. In some embodiments, the session state information may include the text representation, a description of the issue, a description of the solution, updated device diagnostic data, updated network contextual data, and/or so forth. Subsequently, the customer support engine may establish a voice support session between a support application on the support terminal of the human CSR and the virtual assistant application on the user device. At this point, a virtual chat agent of the virtual assistant application is replaced with the human CSR. The human CSR is then able to ask the customer via the voice support session as to whether the virtual chat agent was able to resolve the issue for the customer. If the issue is not resolved, the human CSR may further use human knowledge and expertise to offer additional assistance to the customer based on the session state information and/or additional information provided by the customer.

In some alternative embodiments, the customer support engine may initiate the voice support session only when the customer indicated to the virtual assistant application that the issue was incorrectly identified or that the solution failed to resolve the issue. In other embodiments, the machine learning algorithm of the customer support engine may determine, based on the text representation, the device diagnostic data, and/or the additional sources data that the issue experienced by the customer is a priority issue (e.g., a core network component issue). As such, the customer support engine may advance the customer to the front of the assistance queue and establish the voice support session without directing the virtual assistant application to prompt the customer for permission to apply the solution.

The ability to use virtual assistants in combination with human CSRs for supporting customer issues may in some instances allow customer issues to be resolved prior to the customers talking to the human CSRs. Since most consumers are generally familiar with interacting with virtual assistants, this enhanced approach may reduce the time that a customer spends on the phone with a human CSR without degrading the customer support experience and negatively impacting customer satisfaction. Further, this enhanced approach may result in significant human, time, and infrastructure resource savings for the wireless carrier network. The techniques described herein may be implemented in a number of ways. Example implementations are provided below with reference to the following figures.

Example Architecture

FIG. 1 illustrates an example architecture 100 that provides device-based audio processing for enhanced customer support in the context of wireless telecommunication services, in which the example architecture includes a wireless carrier network 102. The wireless carrier network 102 may provide a wide range of mobile communication services, as well as ancillary services and features, to subscribers and associated mobile device users. In various embodiments, the wireless carrier network 102 may provide wireless communication between multiple user devices. Further, the wireless carrier network 102 may also provide communications between the multiple user devices, such as the user devices 104, and other user devices that are serviced by other telecommunications networks. In various embodiments, the user devices may include mobile handsets, smartphones, tablet computers, personal digital assistants (PDAs), smartwatches, and/or electronic devices.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet-switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network 102 may be accessed via wired or wireless local area networks (LANs). For example, a wireless local area network may be a network that is established using Wi-Fi or Bluetooth standards and hardware.

A RAN of the wireless carrier network 102 may include a number of base stations, which are also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network. The core network may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network. The core network may connect to a public packet data communication network, such as the Internet, via one or more gateways. Accordingly, data and voice communications via the RANs, the core network, and the Internet may support a variety of telecommunication services through the wireless carrier network 102. The core network may include one or more computing nodes 106 that support a customer support engine 108. In various embodiments, the customer 110 may download and install a virtual assistant application 112 onto the user device 104, in which the virtual assistant application 112 interfaces with the customer support engine 108. The virtual assistant application 112 and the customer support engine 108 may communicate via the wireless carrier network 102, the Internet, a local area network (LAN), a wide area network (WAN), and/or some other network. In some embodiments, the virtual assistance application 112 may be a sub-application of a customer experience application that is provided by a mobile network operator (MNO) of the wireless carrier network 102. For example, the customer experience application may be configured to enable the customer 110 to view customer account information, set up and modify bill payment options, view and redeem service offers and deals provided by the MNO, purchase additional user devices, obtain assistance from the MNO, and/or so forth.

In operation, the virtual assistant application 112 may provide a virtual chat agent that uses speech to prompt the customer 110 to make a statement or ask a question regarding a problem that the customer 110 is experiencing with the wireless telecommunication services provided by a wireless carrier network. The audio speech 114 that is spoken by the customer 110 is then converted by a speech-to-text algorithm of the virtual assistant application 112 into a text representation 116. For example, the statement or question spoken by the customer 110 may be something like "I can't receive any text" or "I am not getting any signal for my phone, can you help me"?

Following the receipt of the audio speech 114, the virtual assistant application 112 may also collect device diagnostic data 118 from an operating system and/or firmware of the user device 104. For example, the device diagnostic data 118 may include system event reports, system bug reports (e.g., Android® LogCat logs, Java debug Wire Protocol (JWDP)

logs, etc.), data traffic logs (e.g., transmission control protocol (TCP) logs, data packet traces, packet capture (PCAP) logs, and/or so forth). Accordingly, the virtual assistant application 112 may send the text representation 116 and the device diagnostic data 118 to the customer support engine 108. In various embodiments, the virtual assistant application 112 may send the text representation 116 and the device diagnostic data 118 via a data file that is labeled with a request identifier of the customer 110. For example, the request identifier may be a subscriber identifier of the customer 110. The subscriber identifier may include a Mobile Station International Subscriber Directory Number (MSISDN), an International Mobile Equipment Identity (IMEI), an International Mobile Subscriber Identity (IMSI), a customer login identity, a subscriber name, and/or the like. In turn, the customer support engine 108 may place the customer in an assistance queue for a voice support session with a human customer service representative. For example, the customer support engine 108 may place the request identifier of the customer 110 in the assistance queue in a first-in, first-out (FIFO) order, such that the customer 110 is awaiting voice support session with a human CSR, such as the CSR 120.

In the meantime, the customer support engine 108 may use natural language processing (NLP) algorithms to discern the intent contained in the text representation 116. The NLP algorithms may use techniques such as morphological segmentation, part-of-speech tagging, word segmentation, named entity recognition (NER) to parse the language contained in the text representation 116 into speech entities that include semantics, concepts, nouns, etc. Subsequently, the customer support engine 108 may use a machine learning algorithm to analyze the speech entities and the device diagnostic data 118 to determine an issue 122 that is described by the customer 110.

In some embodiments, the machine learning algorithm may incorporate one or more additional sources of data into the determination of the issue 122. In such embodiments, the additional sources of data may include network contextual data 126 from the network operation databases 128 and/or external data 130 from third-party databases 132. In various embodiments, the network contextual data 126 from the network operation databases 128 may include relevant network information, device information, and/or user account information. The network information may include information regarding the technical and operational status of the wireless telecommunication network. For example, network information of the network may indicate that 5G spectrum coverage (or some other spectrum coverage) is unavailable in a particular geographical area or that a network node was temporarily overwhelmed with network traffic at a particular time due to a major event.

The device information of user devices may indicate the technical capabilities, feature settings, and operational statuses of user devices. For example, device information for the user device 104 may indicate that Wi-Fi calling is enabled on the user device or that the user device is capable of using a specific communication band provided by the wireless telecommunication network. In other examples, the device information for the user device 104 may indicate that Wi-Fi calling is disabled on the user device, a developer mode is active on the user device, a location tracking service is active on the user device, and/or so forth. The user account information for a customer may include account details of multiple users, such as account type, billing preferences, service plan subscription, payment history, data consumed, minutes of talk time used, and/or so forth. For example, the account data of the customer 110 may indicate that the user has a postpaid account and that the user is current with payments for the subscribed service plan.

The third-party databases 132 may include databases that are provided by entities other than the wireless carrier network 102. For example, a third-party database may be provided by a third-party vendor, a third-party contractor, a government entity, another telecommunication carrier, a social media website, and/or so forth. The external data 130 may be network-related information, device-related information, and/or user-related information that supplement the network contextual data 126. In some instances, the external data 130 may include regulatory information for networks and devices, device manufacturer information, credit information on users, and/or so forth.

In other instances, the external data 130 may include relevant social media data. The social media data may be provided by social networking portals. Social media portals may include a portal that is established by the wireless telecommunication carrier, a portal that is maintained by a third-party service provider for users to share social media postings, and/or a portal that is created and maintained by a particular user solely for the particular user to present social postings. The social media portals may be mined by the customer support engine 108 for external data that is relevant to the issue that the customer 110 is experiencing with the user device 104 or another user device. For example, social media posting may indicate that a particular geographical area has poor network coverage, a particular model of a user device has below average signal reception, a certain operating system of a user device is prone to a specific software virus, and/or so forth. Accordingly, the customer support engine 108 may use a correlation algorithm to correlate the relevant information mined from the social media portals to the customer 110 and/or the user device 104.

In this way, the machine learning algorithm the customer support engine 108 may use the text representation 116 and the device diagnostic data 118, and in some instances one or more additional sources of data to determine the issue 122 that is experienced by the customer 110. For example, if a particular network cell proximate to a geolocation of the customer 110 is experiencing service disruptions, and the text representation 116 states that "my 5G is not working" the machine learning algorithm may determine that the service issue is a lack of network coverage. In another example, if the device diagnostic data 118 indicates that a web browser on a particular model of user device has stopped working after a software upgrade, and the text representation 116 states that "I can't get on the Internet," the machine learning algorithm may determine that the service issue is improper device software configuration.

Following the determination of the issue 122, the customer support engine 108 may use a solution database 134 to identify a solution 124 that is configured to resolve the issue 122. In alternative embodiments, the machine learning algorithm may be further employed by the customer support engine 108 to identify a most probable solution 124 for resolving the issue 122. For example, the solution 124 may include the implementation of one or more steps, in which the steps may initiate configuration or settings changes to one or more components on the user device 104 and/or one or more components of the wireless carrier network 102. Subsequently, the customer support engine 108 may generate a description of the solution 124 and send the description of the solution 124 to the virtual assistant application 112. In various embodiments, the description may include a solution identifier of the solution 124, a summary of the corresponding issue, a summary of the solution 124, and/or so forth.

In turn, the virtual assistant application 112 may present the description of the solution 124 to the customer 110. For example, the virtual chat agent of the virtual assistant application 112 may use synthesized speech and/or displayed text to present the description of the solution 124, as well as prompt the customer to respond with consent to apply the solution 124. Accordingly, if the customer inputs a consent that grants the virtual assistant application 112 permission to apply the solution, the virtual assistant application 112 may notify the customer support engine 108 of the authorization. For example, the customer may grant permission to the virtual assistant application 112 by verbally providing authorization or manually inputting a command via the tactile user interface of the user device. Once the customer support engine 108 has received the notification, the customer support engine 108 may apply the solution 124 to resolve the issue 122. However, in some instances, the customer support engine 108 may be unable to identify an issue for the customer. In such instances, the customer support engine 108 may store an indication that no issue is identified in the session state information 138 and send a notification to the virtual assistant application 112 to request that the customer 110 wait to speak to a human CSR or restate the problem to the virtual assistant application 112. In additional instances, the customer support engine 108 may be unable to identify a solution for the issue. In such instances, the customer support engine 108 may store an indication that no solution is found for the issue in the session state information 138 and send a notification to the virtual assistant application 112 to request that the customer 110 wait to speak to a human CSR or restate the problem to the virtual assistant application 112.

When the customer 110 has advanced to the front of the assistant queue for speaking with the next available human CSR 120, the customer support engine 108 may provide session state information 138 to a support terminal 140 of the human CSR 120. In some embodiments, the session state information may include the text representation 116, a description of the issue 122, a description of the solution 124, updated device diagnostic data, updated network contextual data, and/or so forth. In various embodiments, the updated device diagnostic data may be requested by the customer support engine 108 from the virtual assistant application 112 following the application of the solution 124. Likewise, the updated network contextual data may be requested by the customer support engine 108 from the network operation databases 128 following the application of the solution 124. The session state information may be presented by a support application 144 on the support terminal 140 of the human CSR 120. A voice support session 142 is then established by the customer support engine 108 between the support application 144 and the virtual assistant application 112 on the user device 104. At this point, the virtual assistant application 112 may disable the virtual chat agent so that that the human CSR 120 may talk with the customer 110 via the voice support session 142. For example, the human CSR is then able to ask the customer via the voice support session as to whether the virtual chat agent was able to resolve the issue for the customer 110. If the issue is not resolved, the human CSR 120 may further use human knowledge and expertise to offer additional assistance to the customer 110 based on the session state information 138 and/or additional information provided by the customer 110. However, if the issue is resolved, the human CSR 120 may use the opportunity to inquire as to whether the customer 110 has any other unresolved issues related to the user device 104. Additionally, the human CSR 120 may also discuss new user device offers or new service offers with the customer 110.

In some alternative embodiments, the customer support engine 108 may initiate the voice support session 142 only when the customer 110 indicated to the virtual assistant application 112 that the issue 122 was incorrectly identified or that the solution 124 failed to resolve the issue. In such embodiments, the customer support engine 108 may prompt the virtual assistant application 112 to generate and present a query as to whether the solution 124 resolved the issue 122 after the solution 124 is applied. The query may be presented by the virtual assistant application 112 via synthesized speech and/or displayed text at the user device 104. Further, the query may prompt the customer 110 to respond by providing an audio input or a tactile input via a user interface of the user device 104. Thus, an input at the virtual assistant application 112 indicating that the issue 122 is resolved by the solution 124 may result in the virtual assistant application 112 terminating the chat session of the virtual chat agent and removal of the customer 110 from the assistance queue. Conversely, an input at the virtual assistant application 112 indicating that the solution did not resolve issue 122 may result in the customer support engine 108 adding a solution failure status to the session state information 138 that is eventually provided to the support application 144.

In other embodiments, the machine learning algorithm of the customer support engine 108 may determine, based on the text representation, the device diagnostic data, and/or the additional sources data that the issue experienced by the customer is a priority issue (e.g., a core network component issue). In such embodiments, the customer support engine 108 may advance the customer 110 to the front of the assistance queue. In this way, the customer support engine 108 may establish the voice support session 142 for the customer 110 with the next available human CSR 120 without directing the virtual assistant application 112 to prompt the customer 110 for permission to apply the solution 124. Instead, the customer support engine 108 may add a priority indicator for the issue 122 to the session state information 138. The priority indicator may prompt the human CSR 120 to manually trigger an application of the solution 124 at the discretion of the human CSR 120. For example, the human SCR 120 may discuss the issue 122 with the customer 110 prior to applying the solution 124. Alternatively, the priority indicator may prompt the human CSR 120 to alert a more knowledgeable human CSR to handle the issue 122 for the customer 110. For example, the support application 144 may include an option for the human CSR 120 to transfer the issue 122, the session state information 138, and the voice support session 142 to a support application of an alternative human CSR.

Example User Device Components

Figure 2:
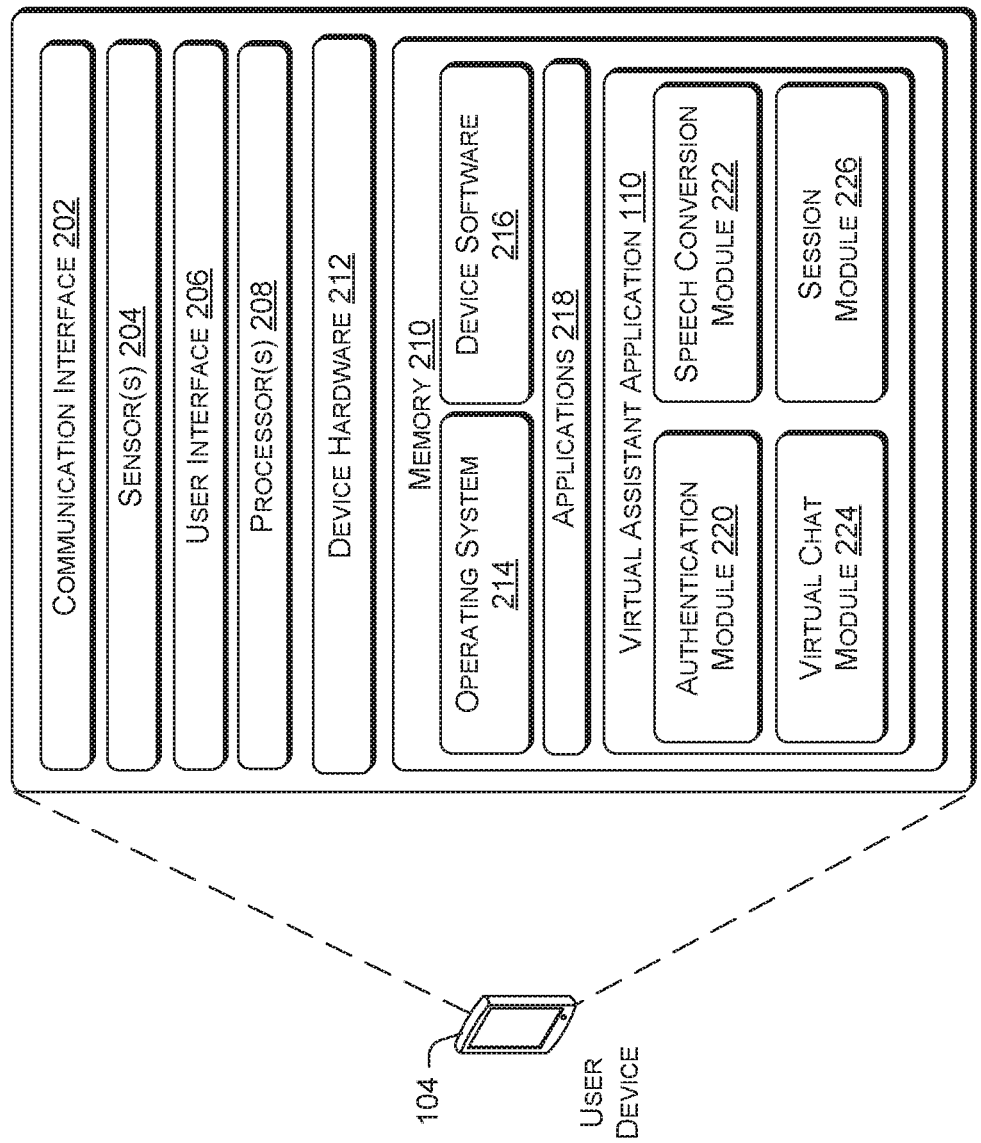
FIG. 2 is a block diagram showing various components of a user device that performs device-based audio processing and interfaces with a customer support engine of a wireless carrier network that provides enhanced customer support in the context of wireless telecommunication services.

FIG. 2 is a block diagram showing various components of a user device that perform device-based audio processing and interfaces with a customer support engine of a wireless carrier network that provides enhanced customer support in the context of wireless telecommunication services. The user device 104 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the user device 104. The compass, the accelerometer, and the GPS sensor may detect orientation, movement, and geolocation of the user device 104. The cameras may capture images of the environment around the user device 104.

The user interface 206 may enable a subscriber to provide inputs and receive outputs from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the user device 104 to perform telecommunication and data communication with a network. The device hardware 212 may further include signal converters (e.g., a digital-to-analog converter, an analog-to-digital converter), antennas, hardware decoders and encoders, graphics processors, a universal integrated circuit card (UICC) or an embedded UICC (eUICC), and/or the like that enable the user device 104 to execute applications and provide telecommunication and data communication functions.

The one or more processors 208 and the memory 210 of the user device 104 may implement an operating system 214, device software 216, one or more applications 218, and the virtual assistant application 112. Such software may include routines, program instructions, objects, and/or data structures that are executed by the processors 208 to perform particular tasks or implement particular abstract data types.

The operating system 214 may include components that enable the user device 104 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, firmware, or a bootloader that boots up the user device 104 and executes the operating system 214 following power-up of the device.

The applications 218 may include applications that provide utility, entertainment, and/or productivity functionalities to a user of the user device 104. For example, the applications 218 may include telephony applications, electronic mail applications, remote desktop applications, web browser applications, navigation applications, office productivity applications, multimedia streaming applications, an online shopping application, and/or so forth.

The virtual assistant application 112 may include an authentication module 220, a speech conversion module 222, a virtual chat module 224, and a session module 226. The authentication module 220 may present interface menus that enable a customer to create or submit login credentials to establish and access a user account with an authentication server of the wireless carrier network 102. The login credentials may include a subscriber identifier, a user password, user biometric data, and/or so forth. Accordingly, the customer 110 may use the login credentials previously established with the wireless carrier network 102 to access services provided by the wireless carrier network 102.

The speech conversion module 222 may convert spoken speech that is received via a microphone of the customer 110 into the text representation 116. In various embodiments, the speech conversion module 222 may include a speech-to-text algorithm that recognizes sound patterns of phonemes as representing words in a particular language. In some embodiments, the speech conversion module 222 may present the string of words that are spoken by the 104 on a display of the user device 104. Conversely, the speech conversion module 222 may include a text-to-speech synthesizer algorithm that is able to convert incoming text strings into synthesized speech that is played back by an audio speaker of the user device 104.

The virtual chat module 224 may use the speech conversion module 222 to communicate with the customer 110. In various embodiments, the virtual chat module 224 may use the speech conversion module 222 to generate synthesized speech that prompts the customer 110 to make a statement, ask a question, reply to a question, or respond with an input to a query or prompt. Accordingly, the virtual chat module 224 may send a request for a support session to the customer support engine 108, in which the request includes a text representation that is generated from the statement or the question. The virtual chat module 224 may also synthesize speech based on incoming text information from the customer support engine 108. For example, the incoming text information may include answers or prompts that are generated by the customer support engine 108. In some instances, the virtual chat module 224 may display the text of the synthesized speech on a visual display of the user device 104. As the customer 110 speaks or replies, the virtual chat module 224 may forward the text representation of the speech to the customer support engine 108. Further, the virtual chat module 224 may also present the text representations of the speech on the visual display of the user device 104.

In this way, the virtual chat module 224 may use the speech conversion module 222 to intake a statement or question regarding a problem that the customer 110 is experiencing on behalf of the customer support engine 108. Further, the virtual chat module 224 may generate synthesized speech that presents a description of an issue, a description of the solution for the issue, and a prompt for permission to implement the solution. In some instances, the virtual chat module 224 may further prompt the customer 110 to indicate whether a solution to the issue actually solved the issue. In turn, the virtual chat module 224 may provide any verbal responses from the customer 110 as text representations to the customer support engine 108. In at least one implementation, the virtual chat module 224 may also have the ability to retrieve device diagnostic data, such as the device diagnostic data 118 for transmission to the customer support engine 108. For example, the virtual chat module 224 may be configured to make APIs calls to the APIs of the operating system 214 and/or firmware to retrieve the device diagnostic data. The virtual chat module 224 may be configured to communicate with the customer support engine 108 via a messaging mechanism and/or a file transfer mechanism.

The session module 226 may be used by the virtual chat module 224 to support a voice, multimedia, and/or messaging session for live interactions between the customer 110 and a human CSR. For example, the session that is supported by the session module 226 may be the voice support session 142. In various embodiments, the session module 226 may be a client application that supports Voice over Internet Protocol (VoIP), Voice over LTE (VoLTE), and/or Session Initiation Protocol (SIP) sessions with another compatible client application. The session may be established using a real-time communication protocol, such as WebRTC, Session Initiation Protocol (SIP), SIP Instant Messaging and Presence Leveraging Extensions (SIMPLE), Application Exchange (APEX), Instant Messaging and Presence Protocol (IMPP), Extensible Messaging and Presence Protocol (XMPP), and/or so forth. Thus, in some embodiments, the voice support session 142 may be substituted with a chat messaging support session between the customer 110 and the human CSR 120.

Example Customer Support Engine Components

Figure 3:
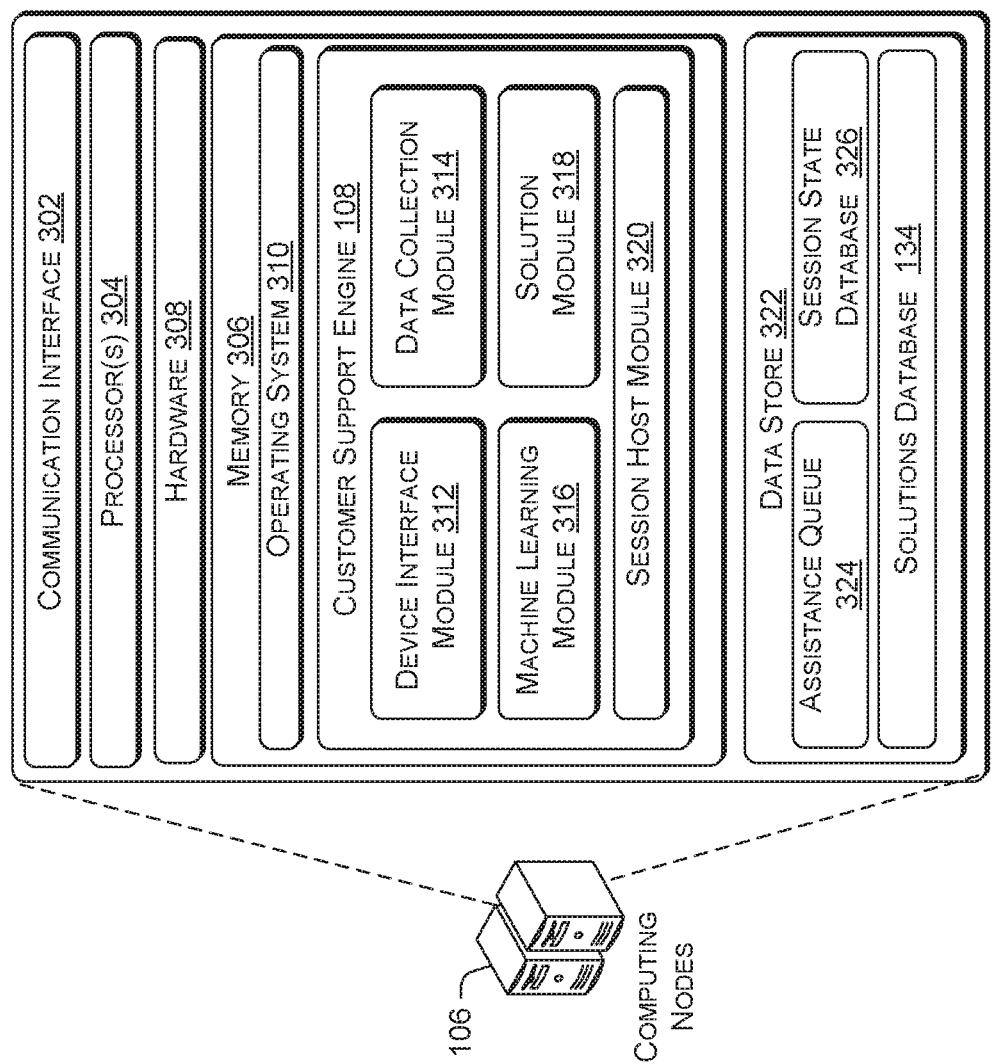
FIG. 3 is a block diagram showing various components of a customer support engine that uses device-based audio processing to provide enhanced customer support in the context of wireless telecommunication services.

FIG. 3 is a block diagram showing various components of a customer support engine that uses device-based audio processing to provide enhanced customer support in the context of wireless telecommunication services. The computing nodes 106 may provide a communication interface 302, one or more processors 304, memory 306, and hardware 308. The communication interface 302 may include wireless and/or wired communication components that enable the devices to transmit data to and receive data from other networked devices. The hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 306 of the computing nodes 106 may implement an operating system 310. In turn, the operating system 310 may provide an execution environment for the customer support engine 108 and the customer support engine 108. The operating system 310 may include components that enable the computing nodes 106 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The customer support engine 108 may include a device interface module 312, a data collection module 314, a machine learning module 316, a solution module 318, and a session host module 320. The modules may include routines, program instructions, objects, and/or data structures that perform particular tasks or implement particular abstract data types. The memory 306 may also include a data store 322 that is used by the customer support engine 108.

The device interface module 312 may receive a text representation from a user device, such as the text representation 116 from the user device 104. The text representation may be included in a request for a support session that is initiated by a virtual assistant application on the user device. In various embodiments, the request may be labeled with a unique request identifier, such as a subscriber identifier that corresponds to a customer who is using the user device. In some instances, the device interface module 312 may use a subscriber database of the wireless carrier network 102, such as a home location register (HLR) to look up a subscriber identifier that corresponds to a device identifier of the user device 104. The device interface module 312 may place the request identifier in the assistance queue 324, thereby assigning the customer a spot in the queue. The device interface module 312 may apply NLP algorithms to the text representation included in the request. The NLP algorithms may parse the language contained in the text representation into a data file of speech entities that include semantics, concepts, nouns, etc. The data file of speech entities is then labeled with the request identifier by the device interface module 312 and forwarded to the machine learning module 316 for processing. The device interface module 312 may also receive device diagnostic data from the virtual assistant application on the user device. For example, the device interface module 312 may receive the request and the device diagnostic data from the virtual assistant application via a messaging mechanism (e.g., WebRTC messaging) and/or a file transfer mechanism, such as a file transfer based on Secure Copy Protocol (SCP), Secure File Transfer Protocol (SFTP), HTTP Secure (HTTPS), and/or so forth. In some instances, the device interface module 312 may send a command that directs the virtual assistant application to collect device diagnostic data of the user device.

The device interface module 312 may further send queries and requests to a virtual assistant application, such as the virtual assistant application 112. For example, the queries and requests may include text data that are presented visually and/or conversion into synthesized speech by the virtual assistant application. For example, the queries and requests may be initiated by the solution module 318. In turn, the device interface module 312 may receive text representations of user responses to the queries and requests and convert them into corresponding speech entities. For example, the speech entities may be replies that are distributed by the device interface module 312 to the solution module 318. In some embodiments, the device interface module 312 may include a machine translation algorithm that translates the text representation into a translated text representation in a foreign language. The translated text representation may be stored by the device interface module 312 in the relevant session state information along with the text representation, such that the translated text representation may be delivered to a support terminal of a human CSR along with or in place of the text representation.

The data collection module 314 may retrieve data from the network operation databases 128 and the third-party databases 132. The data collection module 314 may be directed to do so by the machine learning module 316. In various embodiments, the data collection module 314 may retrieve data that are relevant to a particular user device or the associated customer from the databases based on a corresponding device identifier or a corresponding subscriber identifier. The relevant data for a user device or the customer may include any of the network contextual data 126 and the external data 130 that are related to the provision of telecommunication services to the user device by the wireless carrier network 102. For example, relevant network contextual data may include data that is collected from a RAN that is currently serving the particular user device or a billing history for the associated customer. In another example, relevant external data may include device specification data from a manufacturer database for the particular user device. The data collection module 314 may use data adaptors to retrieve data from the databases of the data sources. For example, the data collection module 314 may use data-agnostic data adaptors to access unstructured databases, and/or database-specific data adaptors to access structured databases.

The machine learning module 316 may analyze the speech entities that represent a stated problem and the device diagnostic data related to a user device to determine an issue that is affecting the user device. In some embodiments, the machine learning module 316 may incorporate one or more additional sources of data, such as relevant network contextual data and/or relevant external data to in the analysis. The machine learning module 316 may store the data analyzed for the user device in a session state information in a corresponding data file in the session state database 326, in which the session state information is labeled with the corresponding request identifier. The machine learning module 316 may use a machine learning model to perform the analysis for the user device and identify an issue. In some instances, the machine learning module may identify multiple probable issues, in which each probable issue is assigned a confidence score that indicates a likelihood that the issue corresponds to the input data. In such instances, the machine learning module 316 may select the probable issue with a highest confidence score as the identified issue.

The machine learning model may be trained via a model training algorithm. The model training algorithm may implement a training data input phase, a feature engineering phase, and a model generation phase. In the training data input phase, the model training algorithm may receive training data. For example, each of the individual training datasets in the training data may include a combination of speech entities, device diagnostic data, relevant network data, and/or relevant contextual data that is labeled with a corresponding issue. The individual training datasets may include datasets that are generated based on prior customer support interactions. During the feature engineering phase, the model training algorithm may pinpoint features in the training data. Accordingly, feature engineering may be used by the model training algorithm to figure out the significant properties and relationships of the input datasets that aid a machine learning model to distinguish between different classes of data. During the model generation phase, the model training algorithm may select an initial type of machine learning algorithm to train a machine learning model using the training data. Following the application of a selected machine learning algorithm to the training data, the model training algorithm may determine a training error measurement of the machine learning model. If the training error measurement exceeds a training error threshold, the model training algorithm may use a rule engine to select a different type of machine learning algorithm based on a magnitude of the training error measurement. The different types of machine learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and the trained machine learning model is generated.

In various embodiments, the machine learning model may be trained using different levels of training data. In one instance, the training data may include training datasets generated from prior customer support interactions of customers in a local area (e.g., one or more states), which results in a local area machine learning model. The customer support interactions may include voice support sessions, message chat support sessions, and/or so forth. Each training dataset may include a text representation or a portion of a text representation that is associated with a wireless communication service problem experienced by a customer, in which the text representation is labeled with a corresponding issue. Accordingly, there may be multiple local area models generated for different local areas served by the wireless carrier network 102. In other instances, the training data may include training datasets generated from prior customer support interactions of customers in a regional area that is larger than the local area (e.g., multiple states), which results in a regional area model. Accordingly, there may be multiple regional area models generated for different regional areas served by the wireless carrier network 102. In additional embodiments, the training data may include training datasets generated from prior customer support interactions of customers in a national area (e.g., a country that encompasses the regional area), which results in a national area model for a country served by the wireless carrier network 102. Accordingly, the machine learning module 316 may be configured to apply a local area model, a regional area model, or a national area model to perform an analysis. In other words, the machine learning module 316 may select a local area model, a regional area model, or a national regional model that specifically encompasses a geolocation of a user device that provided the corresponding text representation to perform the analysis. In various embodiments, the geolocation of the user device may be obtained by the machine learning module 316 from a user device location database of the wireless carrier network 102 or directly from the user device via a geolocation query to the user device.

In alternative embodiments, the machine learning module 316 may use multiple model learning models that are trained using the different levels of training data to analyze the same data. For example, such trained models may include a local area model, a regional area model, and a national area model. In such embodiments, the machine learning module 316 may compare the confidence scores of the probable issues identified by the multiple learning models and select the probable issue with a highest confidence score as the identified issue. However, in some instances, the machine learning module 316 may be unable to identify an issue for the stated problem. In such instances, the machine learning module 316 may store an indication that no issue is identified in the corresponding session state information. For example, the machine learning module 316 may determine that no issue can be identified when the confidence score for an identified issue is below a minimum confidence threshold. Subsequently, the machine learning module 316 may use the device interface module 312 to send a notification to the corresponding virtual assistant application to request that the customer wait to speak to a human CSR or restate the problem to the virtual assistant application.

The solution module 318 may use the solutions database 134 to find a matching solution to an issue identified by the machine learning module 316. For example, if the root cause of a service issue is the lack of network coverage, the potential solution for the issue may be the activation of Wi-Fi calling and/or the installation of a Wi-Fi calling capable router. In another example, if the issue is that the user device software is incompatible with the wireless carrier network 102, the identified solution may be an upgrade to the software of the user device. The solution module 318 may use the device interface module 312 to send one or more queries pertaining to the solution to a virtual assistant application on a user device that initiated the origin request. For example, the queries may include a query that asks the customer associated with the user device whether the customer wants the customer support engine 108 to apply the solution to try to resolve the issue. Another query may ask the customer whether the applied solution resolved the issue for the customer. However, in other embodiments, the solutions module 318 may be configured to automatically apply the solution once the issue is identified by the machine learning module 316.

Following the application of a solution, the solution module 318 may save a description of the identified issue, a description of the identified solution, and the resolution result, e.g., successful resolution or failure, to the data file of session stated information that is labeled with the corresponding request identifier and stored in the session state database 326. In some instances, the solution module 318 may request updated device diagnostic data from the corresponding user device. Alternatively, or concurrently, the solution module 318 may also request current versions of the relevant network contextual data and/or relevant external data that were used in the analysis to derive the solution. The solution module 318 may further store the requested data in the data file of session state information labeled with the corresponding request identifier. In at least one implementation, the solutions module 318 may be configured to remove the customer from the assistance queue 324 when the customer responds that the solution successfully resolved the issue.

In some instances, the machine learning module 316 may identify a problem experienced by a customer with a user device as a priority issue. In such instances, the solutions module 318 may move the customer to the front of the assistance queue 324 when a solution is identified. The solutions module 318 may further note the issue as having priority in the corresponding session state information, so that a human CSR may render assistance. In some instances, the solutions module 318 may automatically apply the identified solution prior to moving the customer to the front of the assistance queue 324. In other instances, the solution module 318 may save a description of the issue, a description of the solution, and an activation link that enables a human CSR to apply the solution to the corresponding session state information. In other instances, the solution module 318 may be unable to identify a solution in the solutions database 134 for the issue. In such instances, the solution module 318 may store an indication that no solution is found for the issue in the corresponding session state information. Subsequently, the solution module 318 may use the device interface module 312 to send a notification to the corresponding virtual assistant application to request that the customer wait to speak to a human CSR or restate the problem to the virtual assistant application.

The session host module 320 may initiate and host a voice support session, such as the voice support session 142, between a virtual assistant application on the user device of a customer and a support application of a human CSR. In various embodiments, the session host module 320 may initiate a voice support session when the customer as identified by a request identifier moves to the front of the assistance queue 324. In at least one embodiment, the session host module 320 may also support chat messaging sessions between the virtual assistant application and the support application. The session host module 320 may retrieve the corresponding session state information from the session state database 326 and send the information to the support application prior to initiating the voice support session. In turn, the support application may present the support session information to the human CSR. In some instances, the human CSR may use an activation link included in the support session information to apply a solution. For example, the support application may include a dashboard function that enable the human CSR to perform customer relationship management, issue troubleshooting, inventory control, sales, and/or so forth by accessing backend services. The support application may include a client service that supports voice and/or messaging sessions that are initiated and hosted by the session host module 320.

Example Visual Interface Screen

Figure 4:
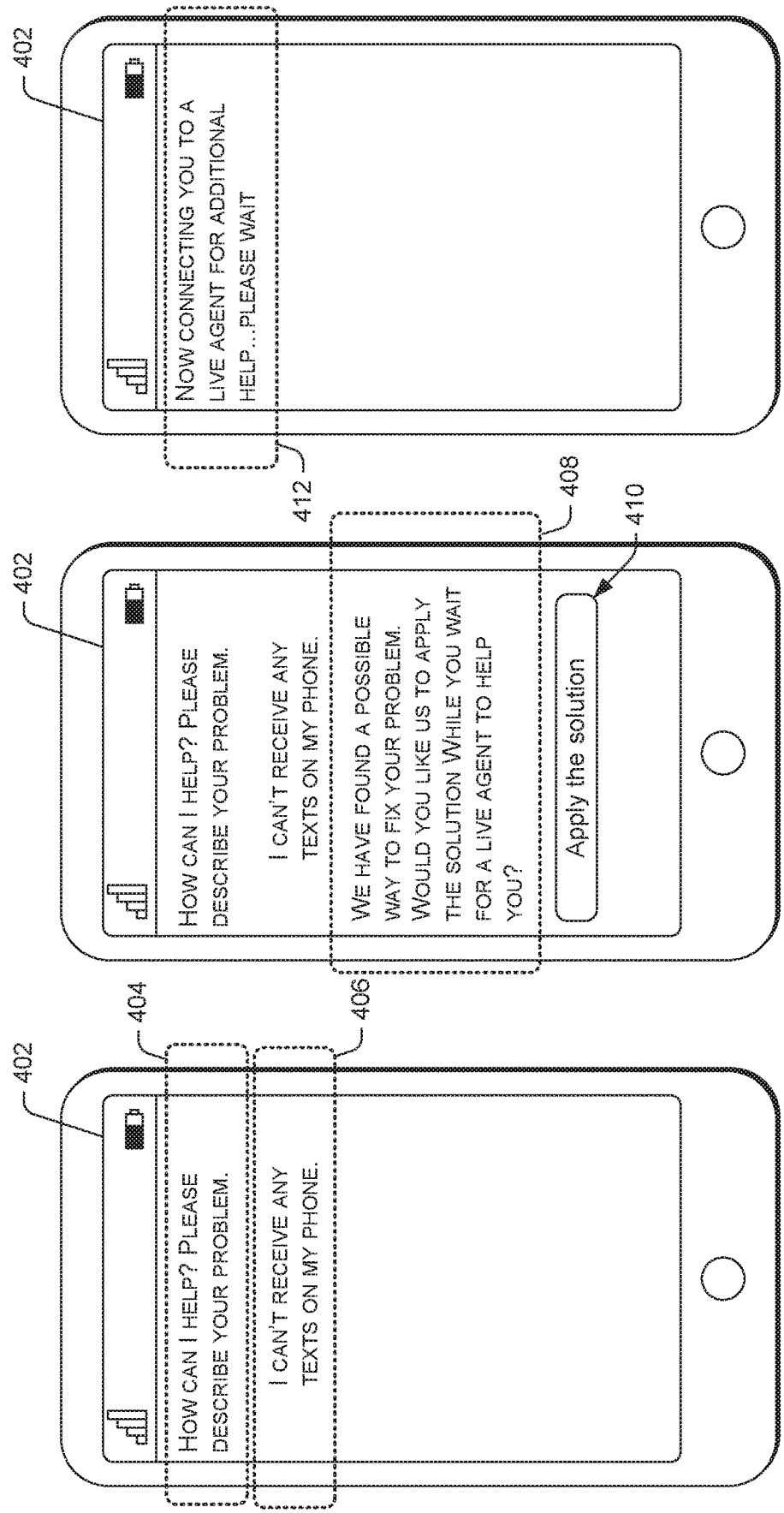
FIG. 4 shows information displayed on an example visual interface screen of a virtual assistant agent as a customer support engine of the wireless carrier network provides enhanced customer support.

FIG. 4 shows information displayed on an example visual interface screen of a virtual assistant agent as a customer support engine of the wireless carrier network provides enhanced customer support. A visual interface screen 402 may be displayed by the virtual assistant application 112 as the customer 110 activates the virtual assistant application 112 on the user device 104. For example, the user may activate the virtual assistant application 112 by speaking a predetermined activation phrase or activating a button option that is present on another visual user interface displayed by the virtual assistant application 112 or displayed by another application on the user device 104. The text 404 that is presented on the visual interface screen 402 may accompany synthesized speech of the text 404 that is outputted by an audio speaker of the user device 104. The text 404 may prompt the customer 110 to make a statement or ask a question about a problem that the customer 110 is experiencing with the wireless telecommunication services provided by a wireless carrier network. As the customer 110 makes the statement or asks the question, the text 406 of the statement or question is processed by a speech-to-text algorithm of the virtual assistant application 112.

The text 408 may be presented by the virtual assistant application 112 once the customer support engine 108 has identified a potential solution for an issue associated with the problem experienced by the customer 110. The text 408 may accompany synthesized speech of the text 406 that is outputted by the audio speaker of the user device 104. The text 408 may be further accompanied by a user control 410 that is displayed on the visual interface screen 402. The user control 410 may be activated by the customer 110 to apply the potential solution. Alternatively, the customer 110 may use a verbal command (e.g., "apply the solution") to direct the customer support engine 108 to apply the solution. Following the application of the solution, the customer 110 may reach a front of an assistance queue (e.g., assistance queue 324) for help from a human CSR. Accordingly, the virtual assistant application 112 may present the text 412. The text 412 may accompany synthesized speech of the text 412 that is outputted by the audio speaker of the user device 104. The text 412 may notify the customer 110 that a human CSR is to assist the customer 110. In some instances, the text 412 may be displayed when the customer 110 indicates via the virtual assistant application 112 that the solution did not resolve the issue.

Example Processes

Figure 5:
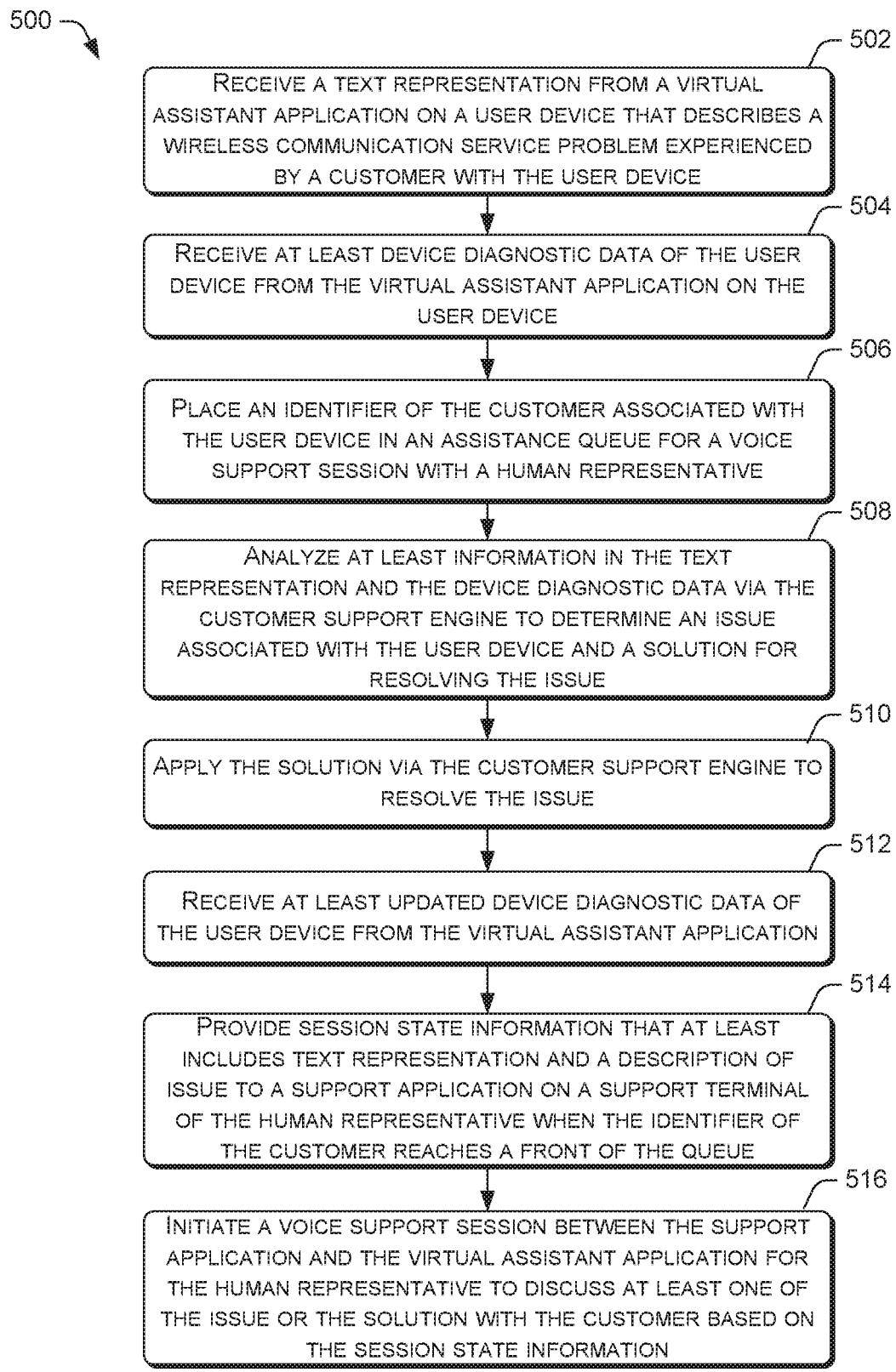
FIG. 5 is a flow diagram of an example process for using device-based audio processing by a virtual assistant application on a user device to provide enhanced customer support in the context of wireless telecommunication services.
Figure 6:
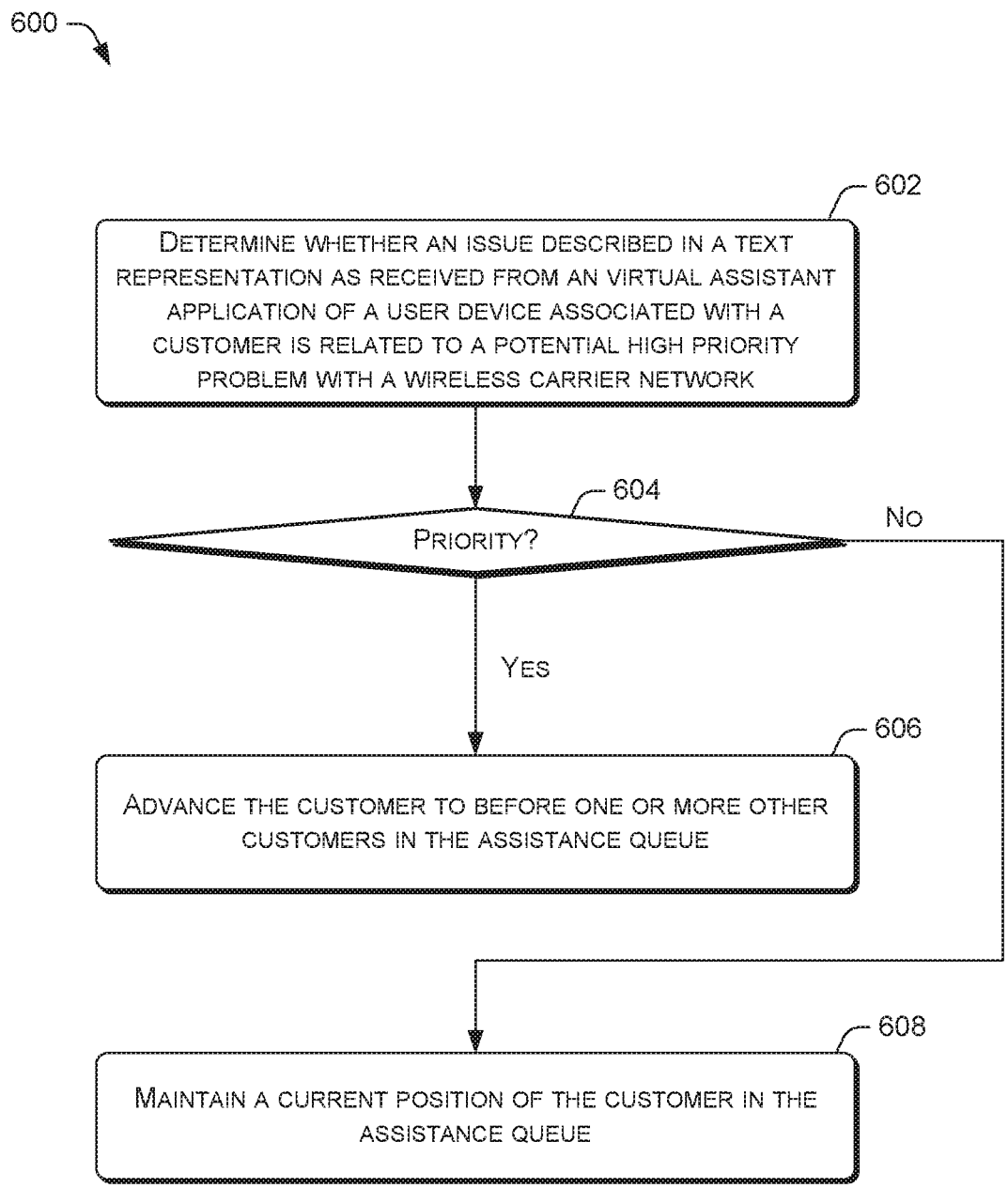
FIG. 6 is a flow diagram of an example process for prioritizing a customer in an assistance queue based on a text representation of an issue inputted by a customer.

FIGS. 5 and 6 present illustrative processes 500 and 600 for providing device-based audio processing for enhanced customer support in the context of wireless telecommunication services. Each of the processes 500 and 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the architecture 100 of FIG. 1.

FIG. 5 is a flow diagram of an example process 500 for using device-based audio processing by a virtual assistant application on a user device to provide enhanced customer support in the context of wireless telecommunication services. At block 502, the customer support engine 108 may receive a text representation from a virtual assistant application on a user device. The text representation may describe a wireless communication service problem experienced by a customer with the user device. In various embodiments, the text representation may be generated from a speech-to-text algorithm of the virtual assistant application from the spoken speech of a user. At block 504, the customer support engine 108 may receive at least device diagnostic data of the user device from the virtual assistant application on the user device. In other embodiments, the customer support engine 108 may also receive relevant network contextual data and/or relevant external data.

At block 506, the customer support engine 108 may place an identifier of the customer associated with the user device in an assistance queue for a voice support session with a human representative. At block 508, the customer support engine 108 may analyze at least information in the text representation and the device diagnostic data to determine an issuance associated with the user device and a solution for resolving the issue. The customer support engine 108 may use an NLP algorithm to convert the text representations into speech entities for analysis. In various embodiments, the customer support engine 108 may use one or more machine learning algorithms to perform the analysis. In some embodiments, relevant network contextual data and/or relevant external data may be analyzed along with the text representation and the device diagnostic data. Once an issue is identified, the customer support engine 108 may use a solutions database to determine a solution.

At block 510, the customer support engine 108 may apply the solution via the customer support engine to resolve the issue. In some embodiments, the solution may include the implementation of one or more steps, in which the steps may initiate configuration or settings changes to one or more components on the user device and/or one or more components of the wireless carrier network 102. At block 512, the customer support engine 108 may receive updated device diagnostic data of the user device from the virtual assistance application. In other embodiments, the customer support engine 108 may also receive updated relevant network contextual data or relevant external data.

At block 514, the customer support engine 108 may provide the session state information that includes at least the text representation and a description of the issue to a support application on a support terminal of the human representative when the identifier of the customer reaches a front of the assistance queue. However, other session state information may include a description of the issue, updated device diagnostic data, newly acquired relevant network contextual data and/or relevant external data.

At block 516, the customer support engine 108 may initiate a voice support session between the support application and the virtual assistant application for the human representative to discuss at least one of the issue or the solution with the customer based on the session state information. However, in some instances, the customer support engine 108 may be unable to resolve the issue for the customer. For example, the customer support engine 108 may be unable to identify an issue, unable to identify a solution for the issue, or the solution as applied may fail to resolve the problem. Such errors may be saved by the customer support engine 108 in the session state information such that the human representative may discuss the errors with the customer.

FIG. 6 is a flow diagram of an example process 600 for prioritizing a customer in an assistance queue based on a text representation of an issue inputted by a customer. At block 602, the customer support engine 108 may determine whether an issue described in a text representation as received from a virtual assistant application of a user device that is associated with a customer is a priority issue with a wireless carrier network. At decision block 604, if the issue is determined to be a priority issue by the customer support engine 108, the process 600 may proceed to block 606. At block 606, the customer support engine 108 may advance the customer to before one or more other customers in the assistance queue. For example, the customer support engine 108 may move the customer to a front of the assistance queue. In some embodiments, the customer support engine 108 may move the customer without prompting the customer to agree for the customer support engine 108 to apply a solution to resolve the issue. However, if the issue is not a priority issue, the process 600 may continue to block 608. At block 608, the customer support engine 108 may maintain a current position of the customer in the assistance queue.

The ability to use virtual assistants in combination with human CSRs for supporting customer issues may in some instances allow customer issues to be resolved prior to the customers talking to the human CSRs. Since most consumers are generally familiar with interacting with virtual assistants, this enhanced approach may reduce the time that a customer spends on the phone with a human CSR without degrading the customer support experience and negatively impacting customer satisfaction. Further, this enhanced approach may result in significant human, time, and infrastructure resource savings for the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a core network of a wireless carrier network storing computer-executable instructions that upon execution cause one or more processors to perform acts comprising:
    receiving a text representation from a virtual assistant application on a user device, the text representation being generated via a speech-to-text engine of the virtual assistant application from audio speech spoken by a customer and received at the user device;
    receiving device diagnostic data of the user device from the virtual assistant application on the user device;
    placing an identifier of the customer in an assistance queue for a voice support session with a human customer service representative;
    analyzing at least information in the text representation and the device diagnostic data from the virtual assistant application on the user device to determine an issue associated with the user device and a solution for resolving the issue;
    applying the solution to resolve the issue associated with the user device, the solution initiating changes to at least one of one or more components on the user device or one or more components of the wireless carrier network;
    in response to an indication received from the virtual assistant application that the solution failed to resolve the issue, providing session state information that includes at least the text representation of the audio speech spoken by the customer, a description of the issue associated with the user device, and a solution failure status to a support application on a support terminal of the human customer service representative; and
    in response to the identifier of the customer reaching a front of the assistance queue, initiating a voice support session between the support application and the virtual assistant application for the human customer service representative to discuss at least one of the issue or the solution with the customer based on the session state information when the indication that the solution failed to resolve the issue is received.

2. The one or more non-transitory computer-readable media of claim 1, wherein the voice support session enables the human customer service representative to further assist the customer with the issue.

3. The one or more non-transitory computer-readable media of claim 1, wherein the analyzing includes converting the text representation via a natural language processing (NLP) algorithm into speech entities for analysis.

4. The one or more non-transitory computer-readable media of claim 1, wherein the session state information that further includes at least one of a description of the solution, an indication of whether the issue is correctly identified, or an indication of whether the solution resolved the issue.

5. The one or more non-transitory computer-readable media of claim 1, wherein the acts further comprise receiving updated device diagnostic data of the user device from the virtual assistant application following an application of the solution, and wherein the session state information further includes the updated device diagnostic data of the user device.

6. The one or more non-transitory computer-readable media of claim 1, wherein the analyzing further includes analyzing the text representation, the device diagnostic data, and at least one of network contextual data of the wireless carrier network or external data from a third-party database.

7. The one or more non-transitory computer-readable media of claim 6, wherein the acts further comprise receiving new network contextual data of the wireless carrier network or new external data from the third-party database following an application of the solution, and wherein the session state information further includes the new network contextual data and the new external data.

8. The one or more non-transitory computer-readable media of claim 1, wherein the applying includes applying the solution in response to receiving permission from the customer via the virtual assistant application to apply the solution.

9. The one or more non-transitory computer-readable media of claim 1, wherein the indication that the solution failed to resolve the issue is received from the virtual assistant application following a presentation of a query by the virtual assistant application as to whether the solution resolved the issue.

10. The one or more non-transitory computer-readable media of claim 1, wherein the acts further comprise determining a geolocation of the user device, and wherein the analyzing includes analyzing the text representation and the device diagnostic data via a machine learning model that is trained based on training data from one or more customer support interactions of customers in a local area that includes the geolocation, of customers in a regional area that includes the local area, or of customers in a national area that includes the regional area.

11. The one or more non-transitory computer-readable media of claim 1, wherein the analyzing includes analyzing the at least information the text representation and the device diagnostic data via multiple machine learning models that are trained using different levels of training data, in which individual models of the machine learning models identify a corresponding potential issue with an associated confidence score, wherein a potential issue with a highest confidence score is selected as the issue.

12. The one or more non-transitory computer-readable media of claim 1, wherein the acts further comprise determining that the issue is related to a potential priority problem with the wireless carrier network, wherein the customer is placed in the assistance queue behind one or more other customers, and wherein initiating the voice support session including advancing the customer before the one or more other customers in response to determining that the issue is related to the potential priority problem.

13. A computer-implemented method, comprising:
receiving, at one or more computing nodes of a wireless carrier network, a text representation from a virtual assistant application on a user device, the text representation being generated via a speech-to-text engine of the virtual assistant application from audio speech spoken by a customer and received at the user device;
receiving, at the one or more computing nodes, device diagnostic data of the user device from the virtual assistant application on the user device;
placing, via the one or more computing nodes, an identifier of the customer in an assistance queue for a voice support session with a human customer service representative;
analyzing, at the one or more computing nodes, at least information in the text representation and the device diagnostic data from the virtual assistant application on the user device to determine an issue associated with the user device and a solution for resolving the issue;
applying, at the one or more computing nodes, the solution to resolve the issue associated with the user device, the solution initiating changes to at least one of one or more components on the user device or one or more components of the wireless carrier network;
in response to receiving, at the one or more computing nodes, an indication received from the virtual assistant application that the solution failed to resolve the issue, providing, via the one or more computing nodes, session state information that includes at least the text representation of the audio speech spoken by the customer, a description of the issue associated with the user device, and a solution failure status to a support application on a support terminal of the human customer service representative; and
in response to the identifier of the customer reaching a front of the assistance queue, initiating, via the one or more computing nodes, a voice support session between the support application and the virtual assistant application for the human customer service representative to discuss at least one of the issue or the solution with the customer based on the session state information when the indication that the solution failed to resolve the issue is received.

14. The computer-implemented method of claim 13, wherein the session state information that further includes at least one of a description of the solution, an indication of whether the issue is correctly identified, or an indication of whether the solution resolved the issue.

15. The computer-implemented method of claim 13, further comprising receiving updated device diagnostic data of the user device from the virtual assistant application following an application of the solution, and wherein the session state information further includes the updated device diagnostic data of the user device.

16. The computer-implemented method of claim 13, wherein the analyzing further includes analyzing the text representation, the device diagnostic data, and at least one of network contextual data of the wireless carrier network or external data from a third-party database.

17. The computer-implemented method of claim 16, further comprising receiving new network contextual data of the wireless carrier network or new external data from the third-party database following an application of the solution, and wherein the session state information further includes the new network contextual data and the new external data.

18. The computer-implemented method of claim 13, further comprising prompting, via the one or more computing nodes, the virtual assistant application to present a query as to whether the solution resolved the issue, wherein the indication that the solution failed to resolve the issue is received from the virtual assistant application following presentation of the query.

19. The computer-implemented method of claim 13, further comprising determining a geolocation of the user device, and wherein the analyzing includes analyzing the text representation and the device diagnostic data via a machine learning model that is trained based on training data from one or more customer support interactions of customers in a local area that includes the geolocation, of customers in a regional area that includes the local area, or of customers in a national area that includes the regional area.

20. A system, comprising:
one or more processors; and
memory including a plurality of computer-executable components that are executable by the one or more processors to perform a plurality of actions, the plurality of actions comprising:
receiving a text representation from a virtual assistant application on a user device, the text representation being generated via a speech-to-text engine of the virtual assistant application from audio speech spoken by a customer and received at the user device;
receiving device diagnostic data of the user device from the virtual assistant application on the user device;
placing an identifier of the customer in an assistance queue for a voice support session with a human customer service representative;
analyzing at least information in the text representation and the device diagnostic data from the virtual assistant application on the user device to determine an issue associated with the user device and a solution for resolving the issue;
applying the solution to resolve the issue associated with the user device, the solution initiating changes to at least one of one or more components on the user device or one or more components of a wireless carrier network;

in response to an indication received from the virtual assistant application that the solution failed to resolve the issue, providing session state information that includes at least the text representation of the audio speech spoken by the customer, a description of the issue associated with the user device, and a solution failure status to a support application on a support terminal of the human customer service representative; and in response to the identifier of the customer reaching a front of the assistance queue, initiating a voice support session between the support application and the virtual assistant application for the human customer service representative to discuss at least one of the issue or the solution with the customer based on the session state information when the indication that the solution failed to resolve the issue is received.

\* \* \* \* \*